United States Patent
Ligman et al.

[19]

[11] Patent Number: 5,828,200

[45] Date of Patent: Oct. 27, 1998

[54] MOTOR CONTROL SYSTEM FOR VARIABLE SPEED INDUCTION MOTORS

[75] Inventors: James R. Ligman; Warren E. Dennis; Thomas M. Ligman, all of Santa Barbara, Calif.

[73] Assignee: Phase III, Santa Barbara, Calif.

[21] Appl. No.: 561,429

[22] Filed: Nov. 21, 1995

[51] Int. Cl.$^6$ .................................. H02P 5/40; H02P 1/42
[52] U.S. Cl. .......................... 318/807; 318/729; 318/798; 318/800
[58] Field of Search .................................. 318/138, 139, 318/245, 254, 700–832

[56] References Cited

U.S. PATENT DOCUMENTS

| | | | |
|---|---|---|---|
| 3,678,352 | 7/1972 | Bedford | 318/138 |
| 3,967,173 | 6/1976 | Stich | 318/227 |
| 3,971,972 | 7/1976 | Stich | 318/227 |
| 4,117,364 | 9/1978 | Baker | 318/230 |
| 4,291,368 | 9/1981 | Yarema et al. | 363/41 |
| 4,409,533 | 10/1983 | Kawabata | 318/807 |
| 4,412,167 | 10/1983 | Green et al. | 318/729 |
| 4,459,529 | 7/1984 | Johnson | 318/729 |
| 4,472,671 | 9/1984 | Shapiro | 318/811 |
| 4,481,455 | 11/1984 | Sugimoto et al. | 318/778 |
| 4,547,826 | 10/1985 | Premerlani | 361/25 |
| 4,575,668 | 3/1986 | Baker | 318/811 |
| 4,636,702 | 1/1987 | Hedges | 318/729 |
| 4,648,022 | 3/1987 | Schauder | 363/159 |
| 4,672,286 | 6/1987 | Williams | 318/798 |
| 4,689,543 | 8/1987 | Hucker | 318/798 |
| 4,767,976 | 8/1988 | Mutoh et al. | 318/808 |
| 4,805,082 | 2/1989 | Heinrich et al. | 363/129 |
| 4,870,557 | 9/1989 | Stacey | 363/43 |
| 4,926,104 | 5/1990 | King et al. | 318/599 |
| 4,941,076 | 7/1990 | Diaz | 363/49 |
| 5,005,115 | 4/1991 | Schauder | 363/159 |
| 5,010,287 | 4/1991 | Mukai et al. | 318/801 |
| 5,304,911 | 4/1994 | Anderson | 318/729 |
| 5,315,225 | 5/1994 | Heinrich et al. | 318/712 |
| 5,350,992 | 9/1994 | Colter | 318/807 |
| 5,387,854 | 2/1995 | McCleer et al. | 318/719 |
| 5,389,869 | 2/1995 | Anderson | 318/729 |
| 5,394,321 | 2/1995 | McCleer et al. | 363/131 |
| 5,461,296 | 10/1995 | Messersmith et al. | 318/779 |
| 5,642,009 | 6/1997 | McCleer et al. | 310/156 |

*Primary Examiner*—Paul Ip
*Attorney, Agent, or Firm*—Milton M. Field; Charles H. Schwartz

[57] ABSTRACT

A control system for a multiphase induction motor includes microcontroller control means providing a variable frequency signal and deriving high side/low side phase signals from the variable frequency signal. Power is applied from an AC/DC converter to the motor by an output drive bridge with three pairs of high side/low side semiconductor switches, one pair for each phase. The high side and low side phase signals are applied through high side/low side driver means to control the switches and effectively apply a quasi-square waveform to the motor windings. The motor and the control system electronics are protected from excessive current levels by current sensing means. When the current exceeds a predetermined level, the microcontroller limits the power drawn by the motor by ramping down the variable frequency to lower the speed of the motor. In case the motor or control electronics overheat, a temperature sensor is monitored by the microcontroller to shutdown the motor. When the motor is started, current inrush is avoided by modulating the phase signals during a start up period. The duty cycle of the modulation is gradually increased in steps until a duty cycle of 100% is reached at the end of the starting period. The voltage level applied to the motor may be reduced. In one embodiment, a voltage controller generates a pulse of fixed width which controls the duty cycle of the converter to lower the voltage level to a particular voltage level when enabled by an enabling signal from the microcontroller. In a second embodiment, a binary signal from the microcontroller to the voltage controller selects a particular pulse width to select the voltage level applied to the motor when enabled by the enabling signal.

19 Claims, 17 Drawing Sheets

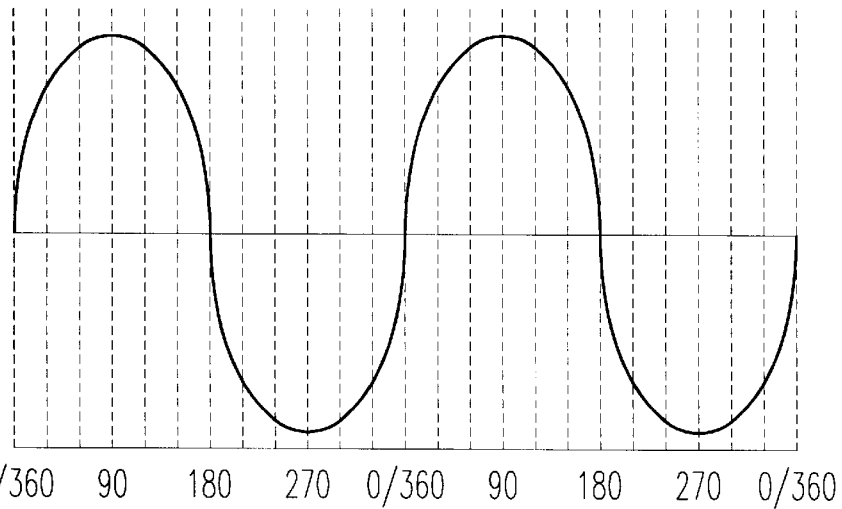
FIG. 5A SINE WAVEFORM
*PRIOR ART*
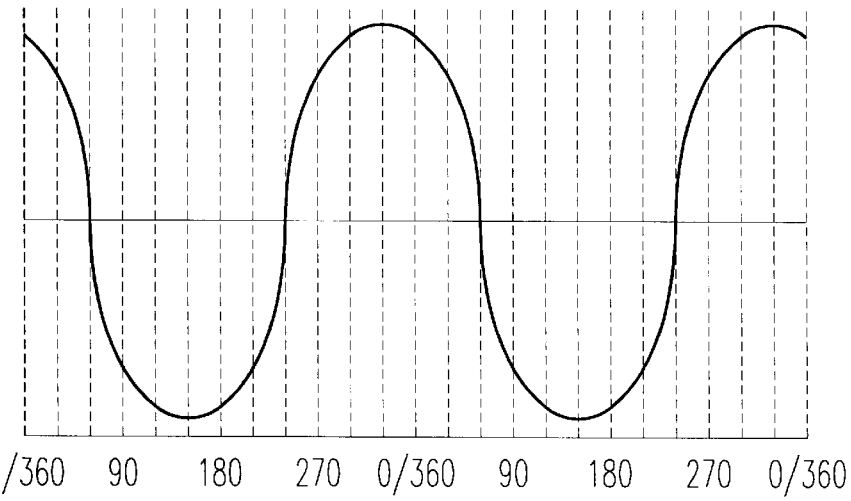
FIG. 5B SINE WAVEFORM
*PRIOR ART*
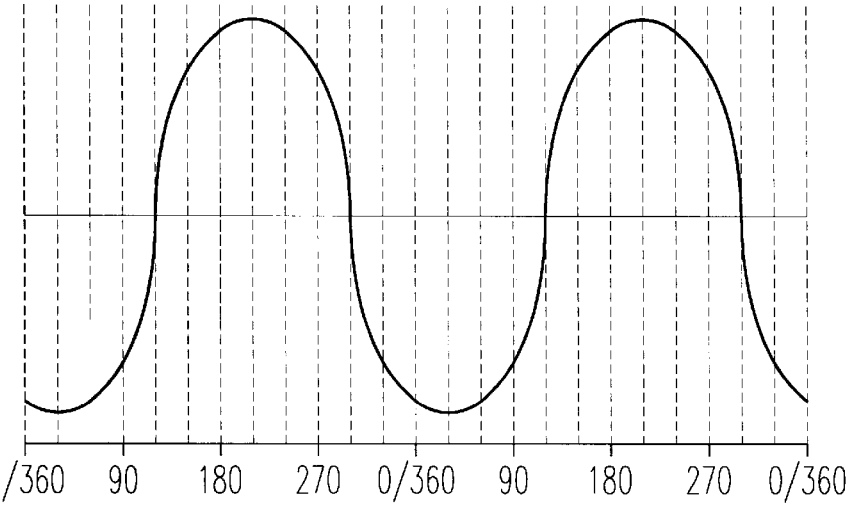
FIG. 5C SINE WAVEFORM
*PRIOR ART*

SQUARE WAVEFORM

SQUARE WAVEFORM

SQUARE WAVEFORM

*PRIOR ART* PWM

*PRIOR ART* PWM

*PRIOR ART* PWM

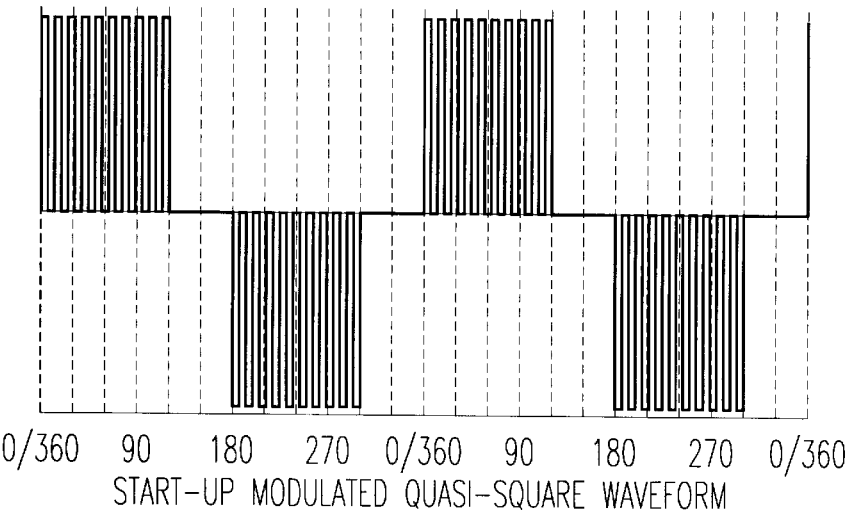
FIG. 9A START-UP MODULATED QUASI-SQUARE WAVEFORM
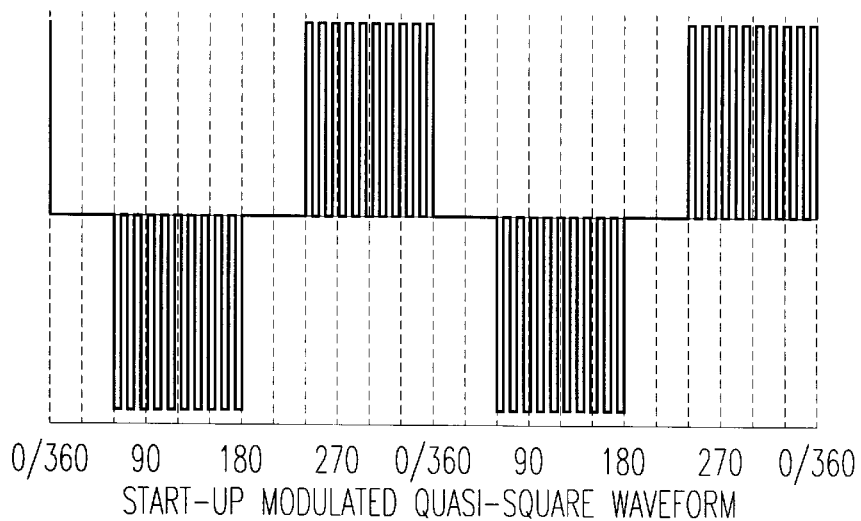
FIG. 9B START-UP MODULATED QUASI-SQUARE WAVEFORM
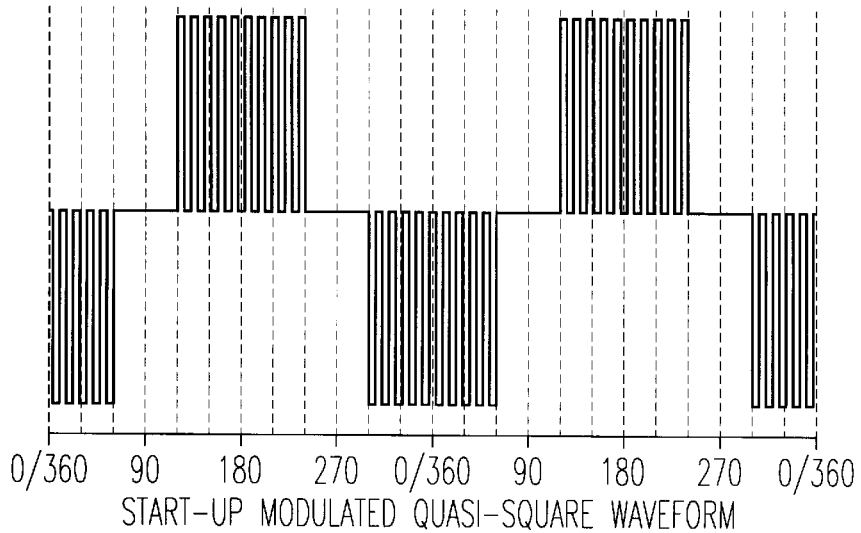
FIG. 9C START-UP MODULATED QUASI-SQUARE WAVEFORM

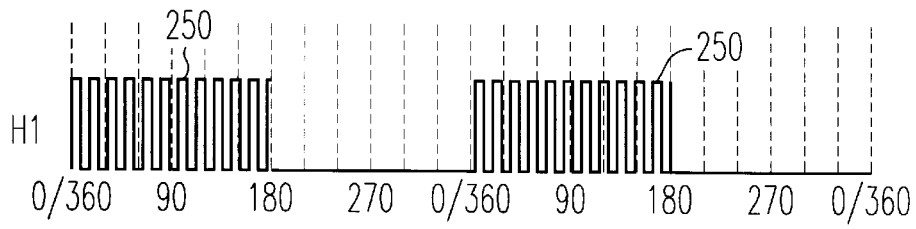
FIG. 10A-1  DRIVE WAVEFORM
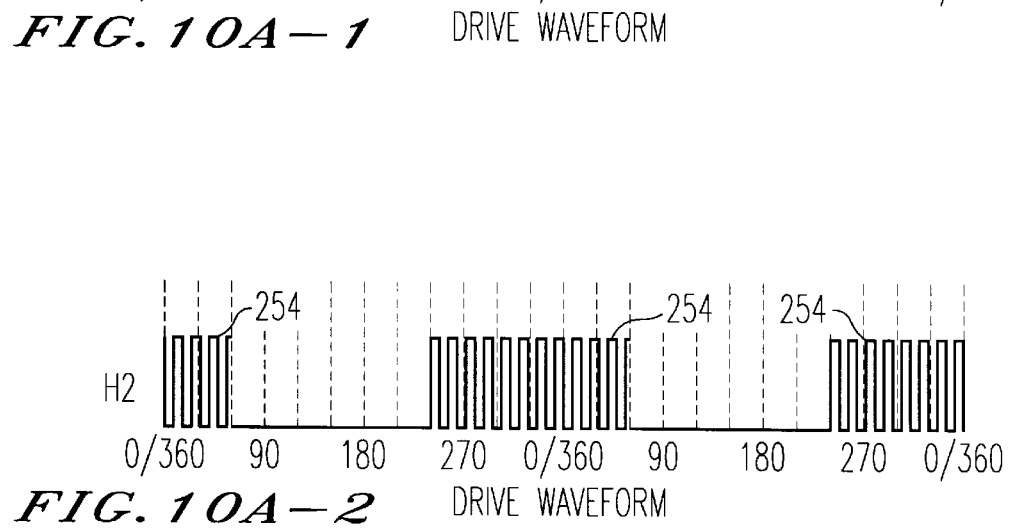
FIG. 10A-2  DRIVE WAVEFORM
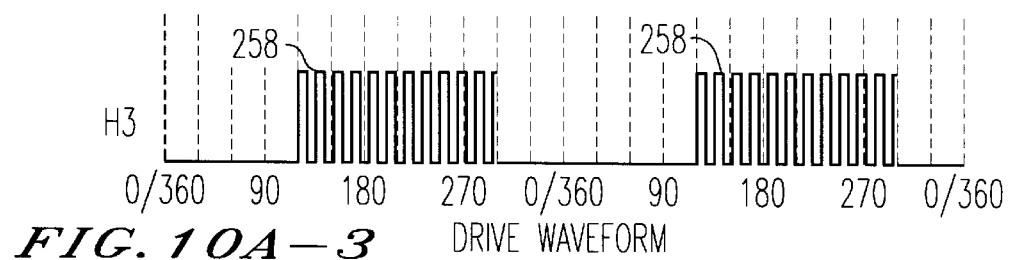
FIG. 10A-3  DRIVE WAVEFORM
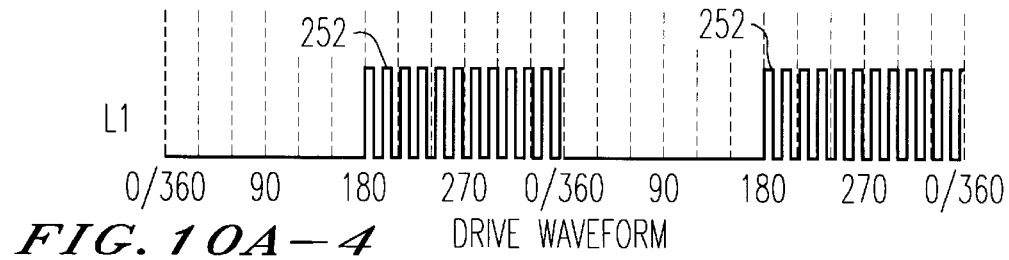
FIG. 10A-4  DRIVE WAVEFORM

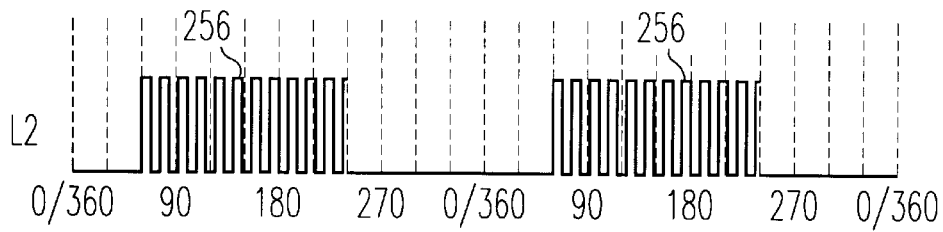
FIG. 10A-5 DRIVE WAVEFORM
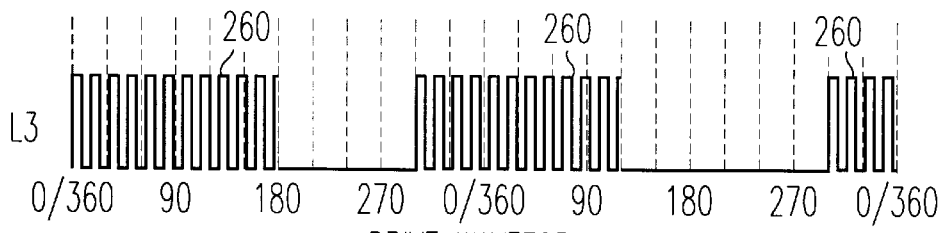
FIG. 10A-6 DRIVE WAVEFORM
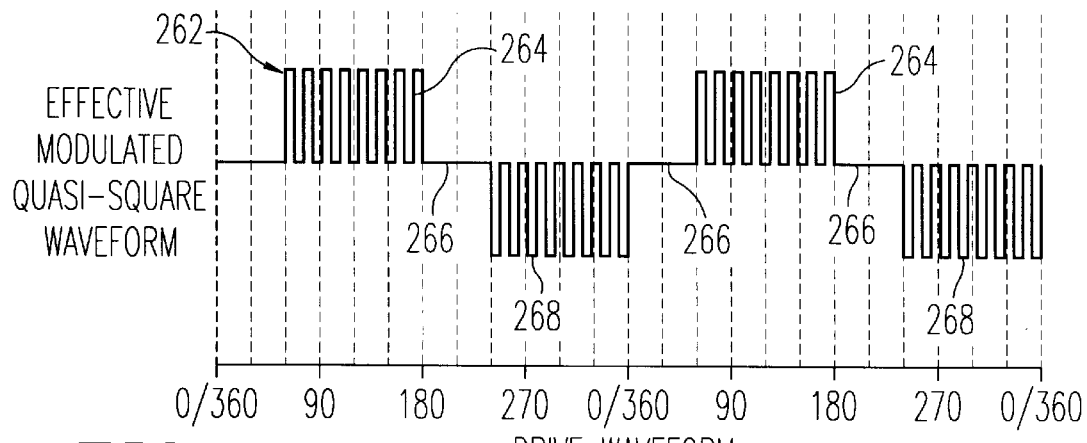
FIG. 10A-7 DRIVE WAVEFORM

MOTOR CONTROL SYSTEM FOR VARIABLE SPEED INDUCTION MOTORS

BACKGROUND OF THE INVENTION

1. FIELD OF THE INVENTION

This invention relates to motor control systems, and more particularly, to motor control systems for variable speed polyphase induction motors incorporating a passive rotor.

2. DESCRIPTION OF THE PRIOR ART

Prior art induction motors have a major limitation in that the motor's speed is a direct function of the AC line frequency. For example, a two pole (one pair of poles) induction motor, a motor with two sets of windings in the stator, will turn the rotor at a nominal speed of 3,600 RPM on a 60Hz AC line (these motors actually run at 3,450 RPM, because a certain amount of slip is required to produce the proper torque). This speed is governed by the following formula:

$$\frac{\text{(LineAFrequency in Cycles per Second)} \times \text{(60 Seconds)}}{\text{(Number of Pairs of Poles)}} = \text{Revolutions per minute}$$

Therefore, in this example:

$$\frac{60\text{Hz} \times 60 \text{ Seconds}}{1 \text{ Pair of Poles}} = 3{,}600 \text{ RPM}$$

This is true for both single phase AC motors as well as polyphase motors. Because of their greater efficiency, three phase motors are used in industrial applications running on a three phase AC power source, which has the form of a sine wave as illustrated in FIGS. 5A, 5B and 5C. However, three phase power is not readily available in residential location for motor applications such as heating, air-conditioning, fans, blowers, spa pumps and well pumps, etc. Furthermore, any standard induction motor connected to an AC line will only operate at speeds synchronous to the frequency of that line.

In order to run a traditional AC induction motor at speeds not synchronous to the AC line (50Hz or 60Hz), an electronic control is required. Because of the nature of single phase induction motors, these electronic controls are generally applied to three phase motors. Therefore, various attempts have been made to operate a conventional three phase induction motor with an electronic control which converts a single phase 50Hz or 60Hz source into a three phase drive source.

These drive sources have been produced with wave forms which may be as simple as a square wave, as shown in FIGS. 6A, 6B and 6C. However, a square wave is a poor approximation of a sine wave. Accordingly, more complex waveforms, which more closely approximate a sine wave, have been provided. One example is a switching power supply which generates a waveform as shown in FIGS. 7A, 7B and 7C. Switching power supplies use high speed switching transistors to turn the power on and off to provide varying pulse width pulses to produce a power curve which closely approximates the power curve of a sine wave. However, power transistors capable of switching large amounts of power at high speed are very expensive and can cause line noise and radio interference, which may require a great deal of shielding and line filtering. These factors add significantly to the cost.

A more efficient and economical alternative is a quasi-square wave drive source, as shown in FIGS. 8A, 8B and 8C. In a quasi-square wave, the positive and negative pulses occupy less than one hundred eighty degrees, being spaced in the example shown by sixty degrees. This waveform is a closer approximation to a sine wave than is a square wave drive; and because of the slower switching rate of the power transistors, it is a more cost effective drive than is a switching power supply. With a quasi-square wave drive source it is possible to use lower cost components and produce greatly reduced levels of line noise and RF interference.

U.S. Pat. No. 4,992,718 is an example of a prior art motor control circuit in which a single phase input is converted to a three-phase output through the use of an inverter. The conduction times of transistors, which are the switching elements of the inverter, are controlled.

The system of U.S. Pat. No. 4,999,560 converts the voltage from a photovoltaic array to a three-phase output using an inverter. A frequency controller increases the frequency of the inverter when the motor is started.

U.S. Pat. No. 4,628,241 is concerned with start-up control of a polyphase induction motor to minimize the initial in-rush of current. Careful control is exercised over the firing of controlled switching means which directly apply respective phases of a three phase AC supply to the motor windings.

U.S. Pat. No. 4,873,478 shows a system for controlling a polyphase motor, particularly at low speeds. A load commuted inverter, including a source side converter, a DC link and a load side inverter, supplies the motor. A current control is responsive to the current in the DC link to control the firing of thyristors in the source side converter.

SUMMARY OF THE INVENTION

It is the object of this invention to provide improved variable speed control systems for multiphase fractional and integral horsepower induction motors, which control system provides a user interface, a wide speed range and improved control of power consumption for variable speed synchronous motor applications using conventionally wound multiphase induction motors.

The motor control systems of the invention monitor the power consumption of the motor at all times. During power on or start up, the electronics of the control system provides a power/frequency control to produce adequate starting torque for the motor application, the starting torque being a function of power and frequency. With the frequency to the motor variable and controllable, it is possible to provide adequate starting torque for a given power input while protecting the control circuit electronics and motor from the high current zero speed condition. The optimization of these conditions maximizes the torque for a given set of electronics in the output driver stage of the control system providing a cost effective design.

Under normal synchronous speed running conditions, with the speed of the motor within an acceptable slip of the input frequency, the current draw will be within the power rating of the motor: i.e., one horsepower, two horsepower, etc., and within the rating of the control system electronics. By varying the input frequency, the control system provides a variable synchronous speed with a two to one speed range at full designated power from an otherwise single speed motor. During a run operation, should the motor draw power in excess of the motor rating, a load current monitor senses the condition; and the control system ramps down the frequency to lower power consumption so that motor or control system electronics safe operating limits are not exceeded. In the case of overheating due, for example, to zero cooling or locked rotor conditions, thermal overload protection is provided.

The control system of the invention includes control means in the form of a microcontroller or processor (hereinafter "MCU") for providing a variable frequency signal and for providing phase signals from the variable frequency signal. Power is applied from a power source to the motor by switch means which are actuated by the phase signals applied through driver means.

In order to protect the motor and control system electronics from excessive current levels, power sensing means in the form of a current sensing resistor senses the power drawn by the motor. When the power exceeds a predetermined level, the MCU limits the power drawn by the motor by ramping down the variable frequency to a lower frequency to lower the speed of the motor.

During a power on or start up period, the MCU keeps the variable frequency signal and the speed of the motor at predetermined low levels. In order to keep the effective starting voltage low, the phase signals are modulated during start up. At the onset of the starting period, the phase signals are pulse width modulated at a relatively low duty cycle. As the starting period proceeds, the duty cycle is increased in steps until a duty cycle of 100% is reached as the starting period ends and full running voltage is applied across the motor.

When the motor is a three phase motor, the phase signals are provided as three pairs of opposite phase signals (designated as high level and low level signals), which pairs are spaced 120 degrees apart. The switch means comprises a three phase bridge for driving the motor, which bridge comprises three pairs of series connected semiconductor switches. The high level and low level signal pairs actuate respective switches of a corresponding pair of switches in opposite phase. The timing of the high and low level signal pairs are so selected that the power waves applied across the phases of the motor are effectively in the form of quasi square waves as is shown in FIGS. 10B-1, 10B-2, 10B-3, 10B-4, 10B-5, 10B-6 and 10B-7.

The power source comprises an AC/DC converter for converting an AC power source to a DC power voltage. The DC voltage level applied by the power source is controlled by a voltage controller which controls the duty cycle of the converter. In one embodiment of the invention, the voltage controller applies a pulse signal having a single width which when applied to the converter through an OR gate reduces its duty cycle. The MCU applies a control pulse to the OR gate. When the control pulse is present, the converter operates at its full duty cycle; and full voltage is provided. When the control pulse is absent, the pulse signal from the voltage controller is enabled to lower the duty cycle for the converter; and a lower voltage is provided. In a second embodiment, the MCU provides a pulse width control signal to the voltage controller to select one of several possible pulse widths. When the voltage controller is then enabled, the lower voltage provided by the converter is at a lower level corresponding to the selected pulse width.

In case the motor or control electronics overheat, when, for example, the motor stops turning or turns too slowly for the cooling fan to be effective, a temperature sensor is monitored by the MCU to shut off power to the motor when overheating is sensed.

The MCU may be initialized for the characteristics of a specific motor. To this end, EPROMs within the MCU may be programmed as to minimum and maximum motor speed, full voltage minimum drive frequency, motor speed ramping rates, starting frequency and the duration of the starting period modulation.

BRIEF DESCRIPTION OF THE DRAWINGS

A clearer understanding of the invention will be apparent from the following description and drawings, wherein:

FIGS. 5A, 5B, 5C, 6A, 6B, 6C, 7A, 7B, 7C, 8A, 8B, and 8C show signal waveforms useful for driving multiphase induction motors;

FIGS. 9A, 9B and 9C shows start modulation applied to quasi-square waveforms;

FIGS. 10A-1, 10A-2, 10A-3, 10A-4, 10A-5, 10A-6 and 10A-7 show the effective formation of modulated quasi-square waveforms; and FIGS. 10B-1, 10B-2, 10B-3, 10B-4, 10B-5, 10B-6 and 10B-7 show the effective formation of unmodulated quasi-square wave forms;

DETAILED DESCRIPTION

Figure 1:
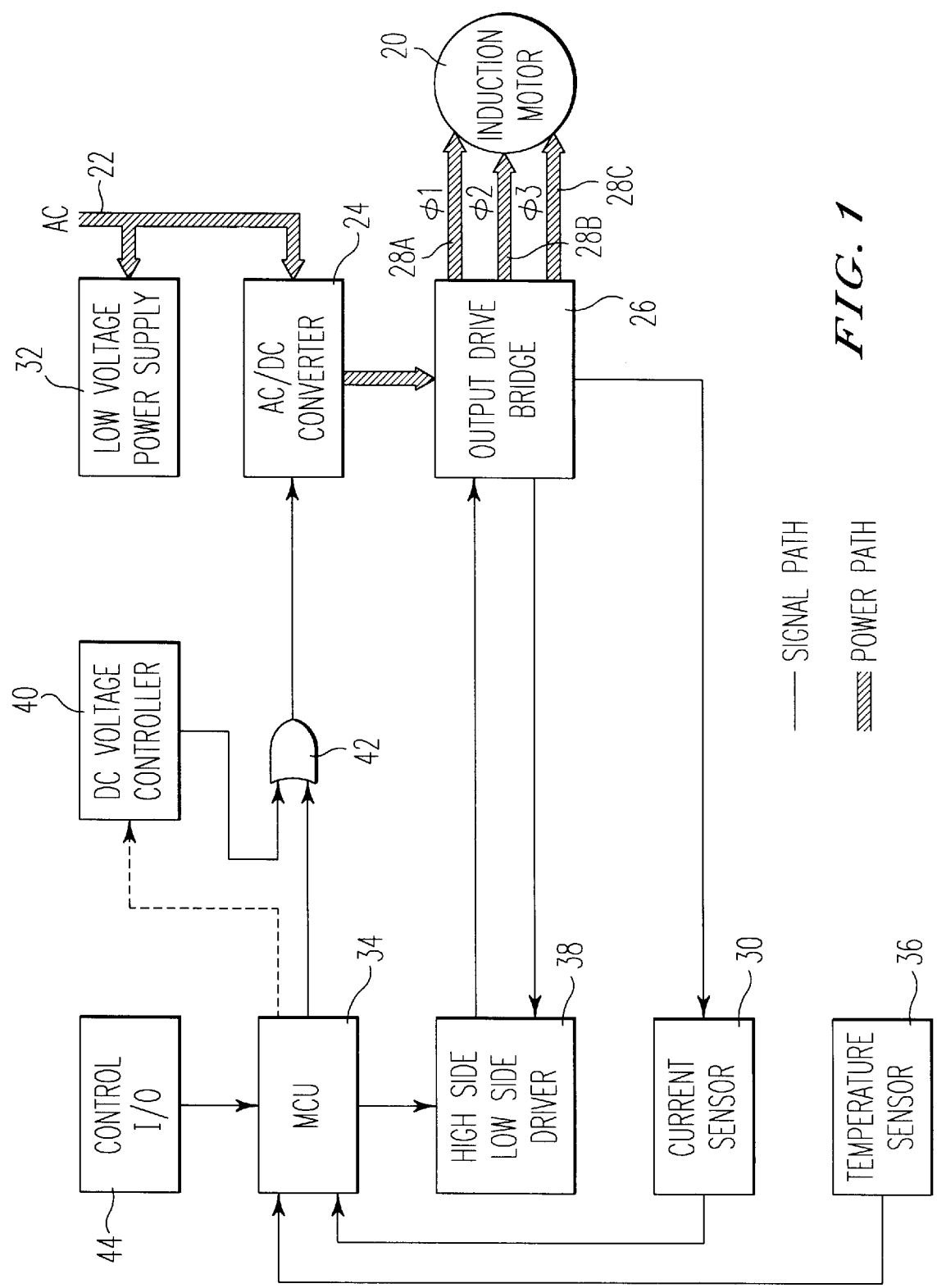
FIG. 1 is a block diagram of embodiments of the invention.

Turning first to FIG. 1, a three-phase induction motor 20 is supplied from an AC power supply 22, which may be an ordinary 50Hz or 60Hz, 115 volt line. The AC supply is applied to an AC/DC converter 24 to supply DC power to a three-phase output drive bridge 26 which provides three drive outputs 28A, 28B and 28C connected to respective phases of motor 20. In order to monitor the load current, output drive bridge is connected to a current sensor 30.

A low voltage power supply 32 is energized from power supply 22 to provide DC voltage to the circuit elements of the control circuit.

The heart of the control system is an MCU processor 34 which generates a variable frequency signal and provides phase signals from the variable frequency signal as will be explained more fully below. MCU 34 also generates modulated phase signals during a start up period and monitors and responds to current sensor 30 and a temperature sensor 36.

The phase signals are provided by MCU 34 as pairs of signals of opposite phase, which are referred to herein respectively as "high side" and "low side" drive signals. These are applied to a high side, low side driver 38 which, in turn, applies the pairs of phase signals to output drive bridge 26 formed from three pairs of series connected semiconductor switches, as will be explained below.

The voltage provided by AC/DC converter 24 may be adjusted by DC voltage controller 40, which as will be explained below, controls the duty cycle of AC/DC converter 24 by applying a pulse of a predetermined width to an input of OR gate 42. The application of the pulse from DC voltage controller 40 is enabled by MCU 34 which applies a control pulse to the other input of OR gate 42. When the output from OR gate 42 is high, AC/DC converter 24 conducts. Thus, when the control pulse from MCU 34 is low and the pulse from DC voltage controller 40 is low, voltage control is enabled and AC/DC converter 24 is non-conductive for a portion of a cycle as determined by the width of the pulse from voltage controller 40. In one embodiment, voltage controller 40 generates a pulse of a fixed single width. AC/DC converter 24 will then provide full voltage of 150 volts or a second lower voltage, such as 50 volts, when voltage controller 40 is enabled. In a second embodiment as indicated in dash line in FIG. 1, MCU 34 applies a multiple level control signal to voltage controller 40 to adjust the width of the pulse applied by voltage controller 40. Four reduced voltage levels may be provided in this way; and these, for example, may be 50 volts, 75 volts, 100 volts and 125 volts. Full voltage of 150 volts is applied when the control pulse from MCU 34 is high.

The software of MCU 34 may be initialized for a particular induction motor by programming EPROMs within MCU 34. The user of the control system or a closed loop system may use input control unit 44 to set the speed of the motor.

Figure 2A:
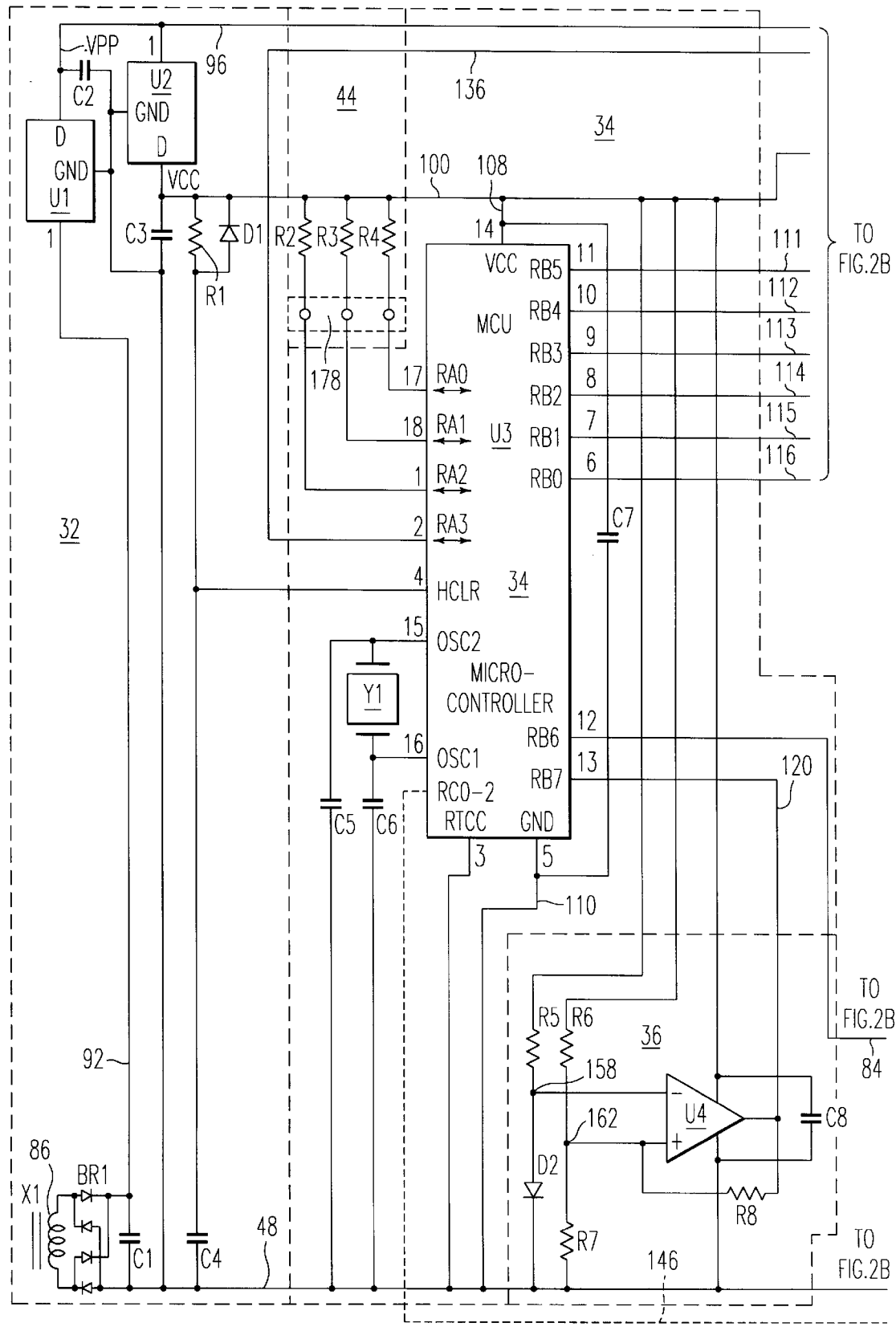
FIGS. 2A, 2B and 2C comprise a detailed circuit diagram of the embodiments of FIG. 1.
Figure 2B:
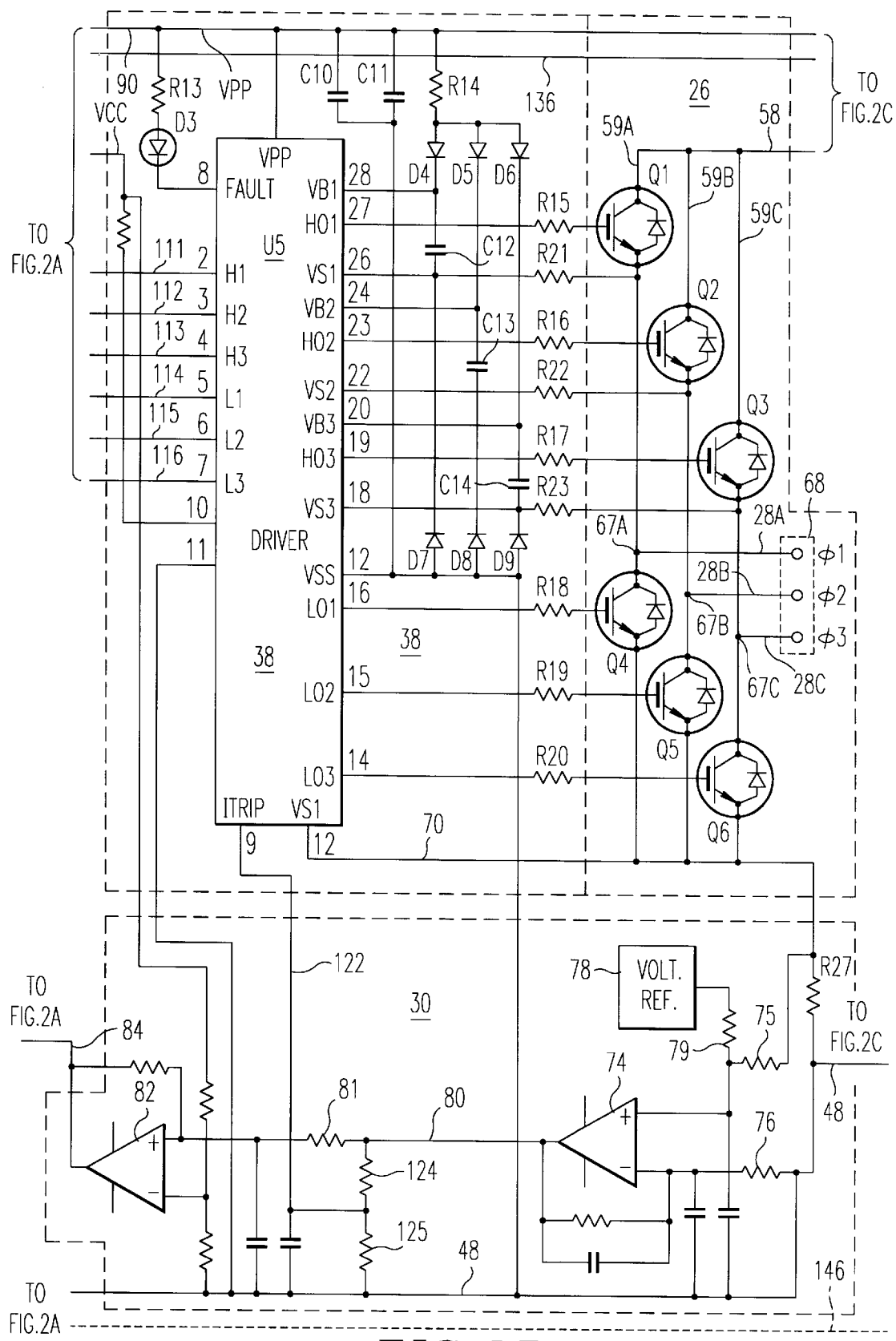
Figure 2C:
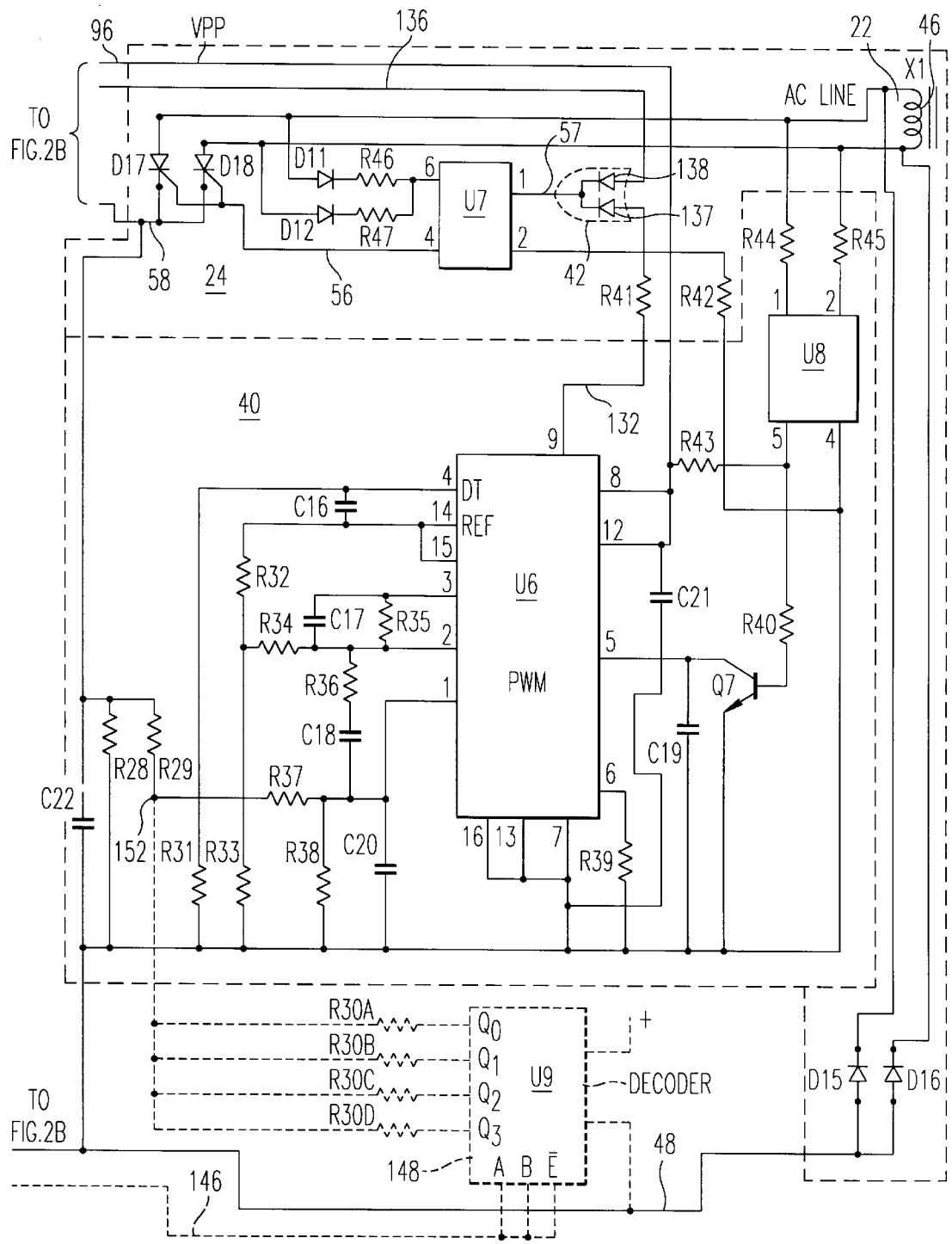

Turning to FIG. 2C, AC line power of 110 to 240 volts AC at either 50 Hz or 60 Hz is provided across winding 46 of transformer X1, the opposite ends of which are connected to ground 48 through diodes D15 and D16 and directly to SCRs D17 and D18 of AC/DC converter 24. The AC power is converted in converter 24 by a controlled full wave bridge consisting of two diodes D11 and D12, two resistors R46 and R47, the two SCRs D17 and D18 and a reservoir capacitor C22 to produce a specified DC voltage of 150 volts on line 58. The triggering of SCRs D17 and D18 is controlled by a triac driver U7, which may be a Motorola MOC 3023, through lead 56. The duty cycles of SCRs D17 and D18 are controlled by controlling the voltage on input terminal 57 of triac driver U7. When input terminal 57 is high, triac driver U7 triggers SCRs D17 and D18 on. When input terminal 57 is low, SCRs D17 and D18 are off. The DC output from converter 24 is applied on line 58 to drive bridge 26, as seen in FIG. 2B.

The bridge comprises three branches 59A, 59B and 59C, each including two semiconductor switches in series. In branch 59A are semiconductor switches Q1 and Q4 in series; in branch 59B are semiconductor switches Q2 and Q5; and in branch 59C are semiconductor switches Q3 and Q6.

Each semiconductor switch comprises a transistor and a reversely poled diode connected between the emitter and collector electrodes of the transistor. Outputs from the bridge are taken from the junction points 67A, 67B and 67C in each branch along respective leads 28A, 28B and 28C to the terminals 68 connected to the phases of the motor (not shown in FIG. 2B).

As will be noted from FIG. 2B, the currents flowing-through the three branches 59A, 59B and 59C, which are connected in parallel, are joined at line 70. This joint current, which is the total current drawn by the motor, is monitored by current sensor 30. The joint current flows through a 0.01 ohm current sensing resistor R27 and is returned to line 48. The voltage across current sensing resistor R27 is applied across the inputs of a differential amplifier 74 through 1,000 ohm resistors 75 and 76. A reference voltage source 78, providing a 0.6 volt reference voltage, is also applied to the "+" input of differential amplifier 74 through a 10,000 ohm resistor 79. When the current through sensing resistor R27 exceeds a predetermined threshold as established by the reference voltage 78 and the values of resistors 75, 76 and 79, differential amplifier 74, provides an output on lead 80 through a 1,600 ohm resistor 81 to a second differential amplifier 82, which, in turn, provides an overcurrent signal on lead 84.

As seen in FIG. 2A, low voltage supply 32 includes a transformer winding 86, which is coupled to transformer winding 46. A rectifier bridge BRI is connected across transformer winding 86, and a capacitor C1 is connected across the output side of rectifier bridge BRI. A lead 92 applies the voltage across capacitor C1 to a 12 volt voltage regulator U1 which provides a voltage VPP of 12 volts on line 96, from which a capacitor C2 is connected to ground 48. A 5 volt voltage regulator U2 is connected to line 96 and provides a voltage VCC of 5 volts on line 100. A capacitor C3 is connected between line 100 and ground 48 in parallel with a circuit including a resistor R1 and reversely poled diode D1 in parallel and a capacitor C4 in series to ground 48. As will be seen from the diagram, voltages VPP and VCC are used for various components of the system.

MCU 34 comprises a Microchip PIC 16C5X EPROM-based 8-bit CMOS microcontroller chip U3 which has oscillator options including the use of a crystal resonator Y1. MCU U3 is a programmable processor, and an example of software for MCU 34 is provided in an appendix to this specification. It is to be understood that this software is for the case of a particular motor in a particular situation. MCU U3 is connected to low voltage supply line 100 through lead 108 and grounded through lead 110 with a 0.1uF capacitor connected between leads 108 and 110.

Among the internal functions for which MCU U3 is programmed are the generation of a variable frequency signal and the production of three pairs of phase signals from the variable frequency signal, which pairs of signals are spaced 120 degrees apart. The phase signals of each pair are high side and low side signals of opposite phase, and these phase signals are provided on leads 111, 112, 113, 114, 115 and 116 to input terminals H1, H2, H3, L1, L2, and L3 of driver 38. (See FIG. 2B). The high level signals are connected respectively to terminals HI, H2 and H3 and the low level signals are connected respectively to terminals L1, L2 and L3. Crystal Y1 plays a role in the generation of the variable frequency, and the two terminals of crystal YI are connected to the OSCI and OSC2 inputs to MCU U3 and through 15pF capacitors C5 and C6 to ground 48.

As will be explained more fully below, MCU U3 is programmed to modulate the phase signals during start-up, increasing the duty cycle of the modulation in steps until the running voltage across the motor is reached. MCU U3 also polls line 84 for an indication that the current through current sensing resistor R27 exceeds a predetermined limit and line 120 from temperature sensor 36 for an indication that the temperature sensed exceeds a predetermined limit. MCU U3 also receives signals on terminals RAO, RA1 and RA2 from input control 44 for setting motor speed, as is explained below.

High side, low side driver 38 comprises an International Rectifier IR 2131 U5, which is a high voltage, high speed power MOSFET and IGBT driver with three independent high side and low side referenced output channels. A current trip function which terminates all six outputs responds to excessive current through current sensing resistor R27. An output 122 from current sensor 30, which monitors the voltage on line 80 through a connection to a voltage divider comprising resistors 124 and 125, is applied to the ITRIP terminal of driver U5. An LED fault indicator D3 is connected between FAULT terminal of driver U5 and VPP line 96 through a 4,700 ohm resistor R13. Driver U5 has six output terminals H01, H02, H03, L01, L02 and L03, corresponding to input terminals H1, H2, H3, L1, L2 and L3, which are connected through 100 ohm resistors R15, R16, R17, R21, R22 and R23 to the input electrodes of semiconductor switches 60, 62, 64, 61, 63 and 65.

As shown in FIG. 2C, DC voltage controller 40 includes a Motorola TL 594 precision switchmode pulse width modulation (PWM) control circuit U6 which provides an output 132 through resistor R41 to an input to OR gate 42, the other input to which is applied from terminal RA3 of MCU U3 on line 136. OR gate 42 includes a pair of diodes 137 and 138 connected respectively to lines 132 and 136. When line 136 is high, control circuit U6 does not control the duty cycle of converter 24; but when line 136 is low, control circuit U6 is enabled and controls the duty cycle of AC/DC converter 26 by applying a pulse of predetermined width to triac driver U7. In order to properly time the pulse from control circuit U6, a Motorola H11AA1 AC signal monitor U8 which is connected across AC line 22 and provides an output pulse indicating the time of zero crossing of the AC wave, applies a pulse through a 10,000 ohm resistor R40 to the base electrode of a transistor Q7 which triggers control circuit U6 to initiate the generation of the pulse. In one embodiment, the width of the pulse generated by control circuit U6 is fixed. When enabled, it lowers the duty cycle of AC/DC converter 24 so that the voltage on line 58 is at a lower level, which, for example is 50 volts, as contrasted to full voltage of 150 volts on line 58 when MCU U3 keeps line 136 high. In a second embodiment, features of which are shown in dash line in FIGS. 2A, 2B and 2C, MCU U3 provides a binary control signal from terminal RC0-2 on line 146 to input terminals A, B and $\overline{E}$ of Motorola MC 14556B binary decoder U9 providing four possible outputs on terminals $Q_0$, $Q_1$, $Q_2$ and,$q_3$ through respective resistors R30A, R30B, R30C and R30D to a point 152 in the circuit of PWM control circuit U6. Depending on the value of the signal on line 146, one of four different pulse widths can be selected. When enabled by the signal on line 136, this permits the selection of four possible reduced voltage levels which may, for example, be 50 volts, 75 volts, 100 volts and 125 volts. These multiple voltage levels extend the range of usable drive frequencies that can be applied to the motor. Because the system sets both voltage and running frequency, a speed range of 4:1 can be achieved. These speeds are asynchronous to the frequency of the AC power input to AC/DC converter 24.

Temperature sensor 36 includes a temperature sensitive diode D2 connected in a series circuit with a 10,000 ohm resistor R5 from VCC line 100 to ground line 48. The junction 158 between resistor R5 and diode D2 is connected to the negative input of differential amplifier U4, the positive input to which is connected from the junction point 162 of a voltage divider formed by resistors R6 and R7, which have values of 22,000 ohms and 3,500 ohms, respectively. When the temperature exceeds a predetermined level, diode D2 becomes conductive, causing an output signal on output line 120 from differential amplifier U4. This signal is applied through terminal RB7 of MCU U3, which responds, by disabling the system by shutting off the drive signals on lines 111–116.

Input control circuit 44 is used by an operator or by control signals to select a motor speed. In one embodiment shown in FIG. 3A, an operator can manually select motor speed. An external binary speed selector 170 includes three switches 171, 172 and 173, which may selectively connect lines 174, 175 and 176 to ground. Lines 174, 175 and 176 are connected to a terminal strip 178 having terminals 180, 181 and 182 from which 4,700 ohm resistors 184, 185 and 186 are connected to VCC (5 volt) supply line 100. Different combinations of switch actuation yield seven possibilities: one corresponds to zero speed and the other six correspond to six speeds any one of which may be selected by the operator. Terminals 180, 181 and 182 connect the binary signal selected to terminals RA0, RA1 and RA2 of MCU U3, which in response to the signal received, adjusts the variable frequency so that the motor 20 runs at the selected speed.

Figure 3B:
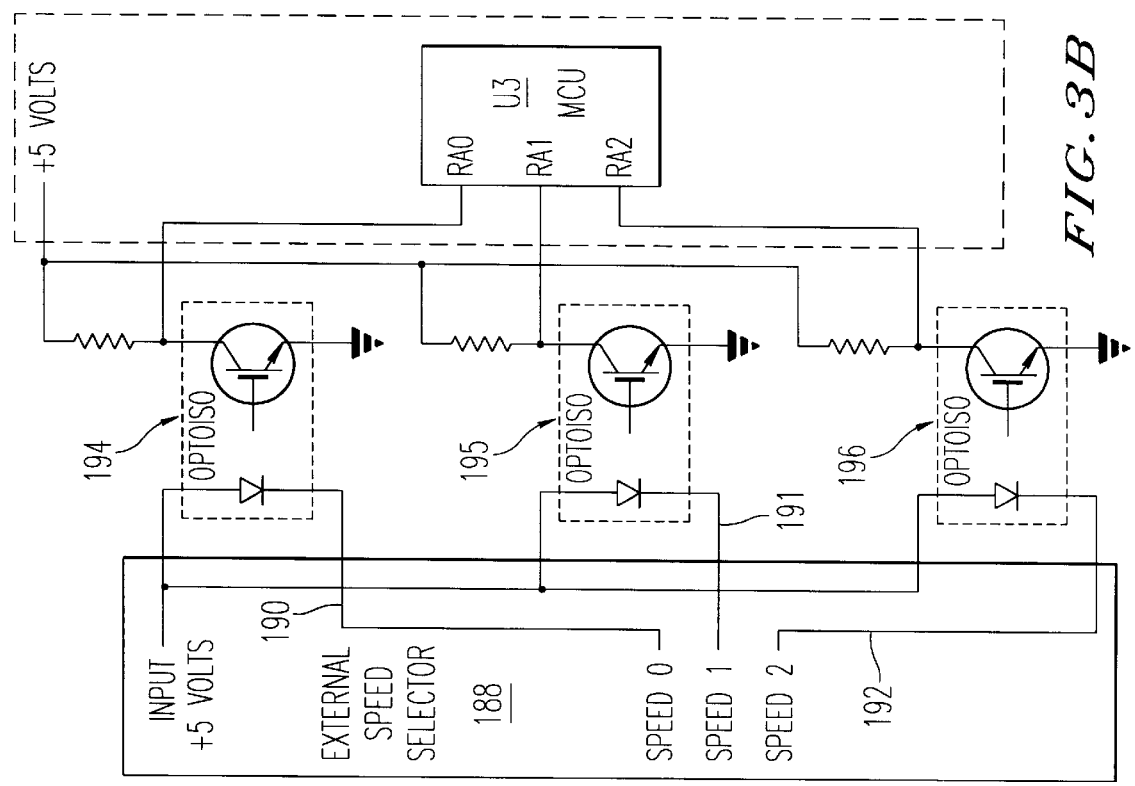
FIGS. 3A and 3B are embodiments of input control circuits of the system of FIGS. 2A, 2B and 2C.
Figure 3A:
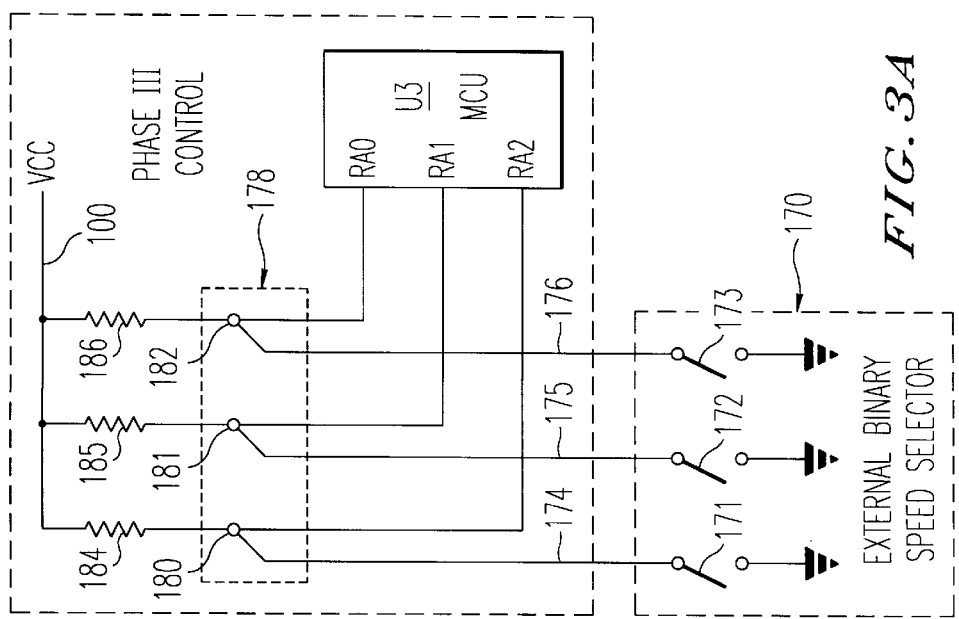

The motor speed can also be controlled by an analog input for variable speed applications such as closed loop function/speed control. That is, with either a variable analog or stepped digital input the motor speed can be controlled to a set of preset operations. This input can monitor flow, pressure, mixture, content or any other component of any gas (including air) or liquid (including water) that can be moved by a pump, blower or compressor (or like device) attached to the motor. The speed of the motor, and therefore the amount of work, can be adjusted to maintain a given flow, pressure or the like. This principle will work for any type of motor load (i.e., milling, lathe work and the like). As shown in FIG. 3B, the external speed selector 188 is part of a closed loop system. For example, three binary signals "speed O", "speed 1" and "speed 3" are received on lines 190, 191 and 192, which respectively apply inputs to optoisolators 194, 195 and 196, the outputs from which are applied to terminals RA0, RA1 and RA2 of MCU U3. In response to the signal received, MCU U3 adjusts the variable frequency so that motor 20 runs at the selected speed.

Figures 1, 10B:
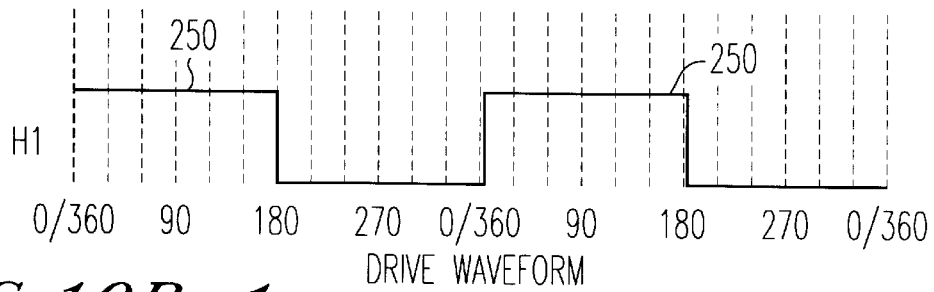
Figures 2, 10B:
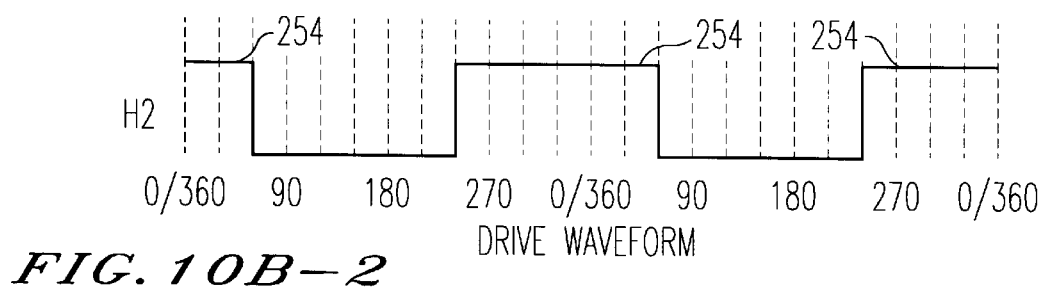
Figures 3, 10B:
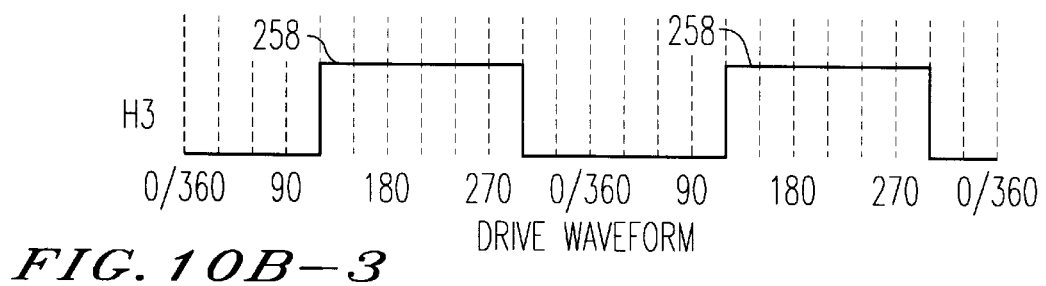
Figures 4, 10B:
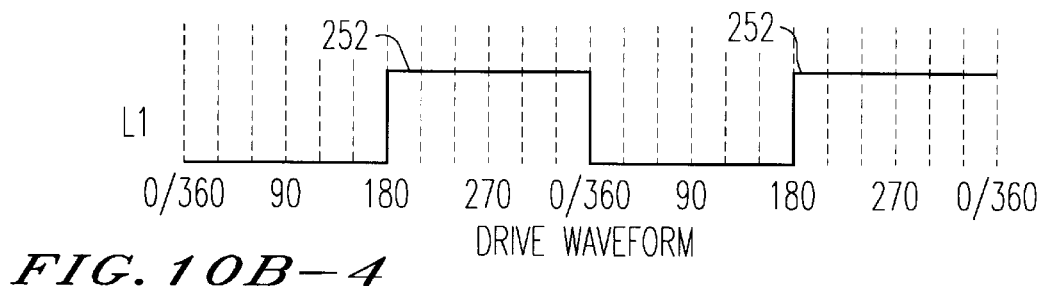
Figures 5, 10B:
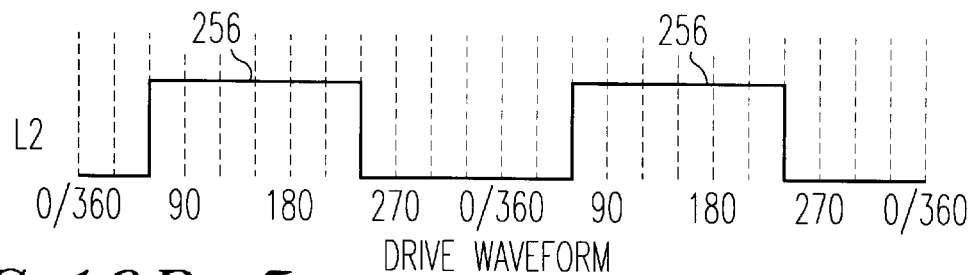
Figures 6, 10B:
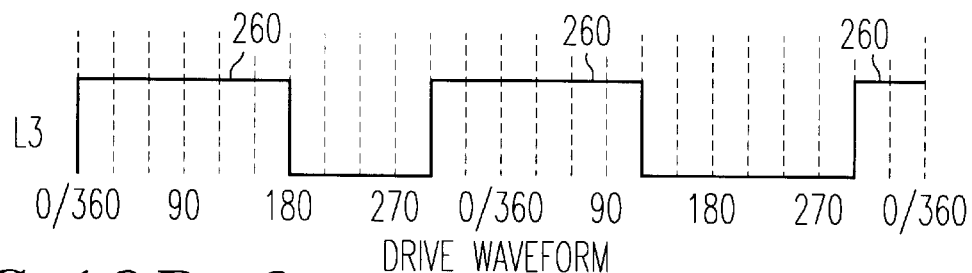
Figures 7, 10B:
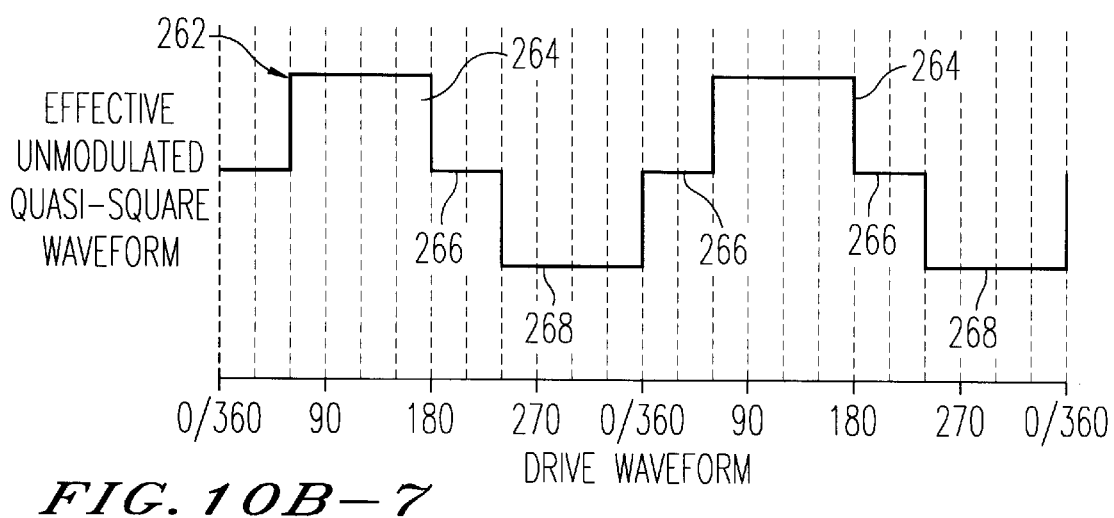

The quasi-square wave polyphase drive signal generated by MCU U3 controls the high side/low side driver 38, which, in turn, controls the output drive bridge 26. The rectified DC from AC/DC converter 24 is switched on and off by the six electronic switching devices of drive bridge 26 as controlled by MCU U3 and the driver 38. The circuit creates a quasi-square wave 3-phase drive, as shown in Figs. 10A and 10B, which runs a "Y" or Delta-wound 3-phase induction motor at speeds which are in direct relationship to the frequency of the drive signal and the voltage from the AC/DC converter 24. Each phase of the motor is controlled by a pair of output driver bridge 26 electronic switching devices (one high side and one low side).

A conventional AC induction motor running off an unregulated AC line will draw a great deal of power (current) from the line at any time that the slip angle, that is the ratio between the AC drive frequency and the rotational speed of the rotor in the motor is too great. This is especially true at start-up when, with a 50 Hz or 60 Hz AC signal and a stationary rotor, the slip angle is infinite. To overcome this huge current inrush, which is far greater than the rating of output drive bridge 26 and the electronic switching devices in the bridge, MCU U3 modulates the drive signal to output drive bridge 26 with a duty cycle from 20% to 100%. The effective power of the quasi-square wave drive signal is thus regulated by MCU U3 to avoid current inrush during the start up period. The frequency of the quasi-square wave drive is held at the full voltage minimum drive frequency that will run the motor at full DC voltage without saturating the motor core until the duty cycle modulation reaches 100%.

The overall current through the output drive bridge 26 is constantly monitored by MCU U3 to pre-set limits. Should this limit be reached at start up or at any other time that the motor is running, MCU U3 will reduce the quasi-square wave drive frequency until the current drops below this pre-set limit. If the full voltage minimum drive frequency is reached before the current drops below the pre-set limit or at start up, MCU U3 will turn off the drive signal to the output drive bridge. MCU U3 will then make a specified number of attempts to restart the motor. If the current limit is reached after the final restart try, U3 will shut of the drive signal. Because, at a given voltage, the power draw of the control circuit will be lower as the frequency is lowered, high current at full voltage minimum drive frequency indicates a problem which would damage the control system if MCU U3 did not shut off the drive signal to the output drive bridge 26.

The operating temperature of output drive bridge 26 is constantly monitored to a pre-set limit by MCU U3. Should this limit be reached, MCU U3 will turn off the drive signal to output drive bridge 26. There is hysteresis built into temperature sensor 36 so that the temperature must drop a specified number of degrees below the pre-set temperature limit before the MCU 34 will re-start the motor. The control can cycle in the shut off and re-start mode indefinitely.

Figure 4A:
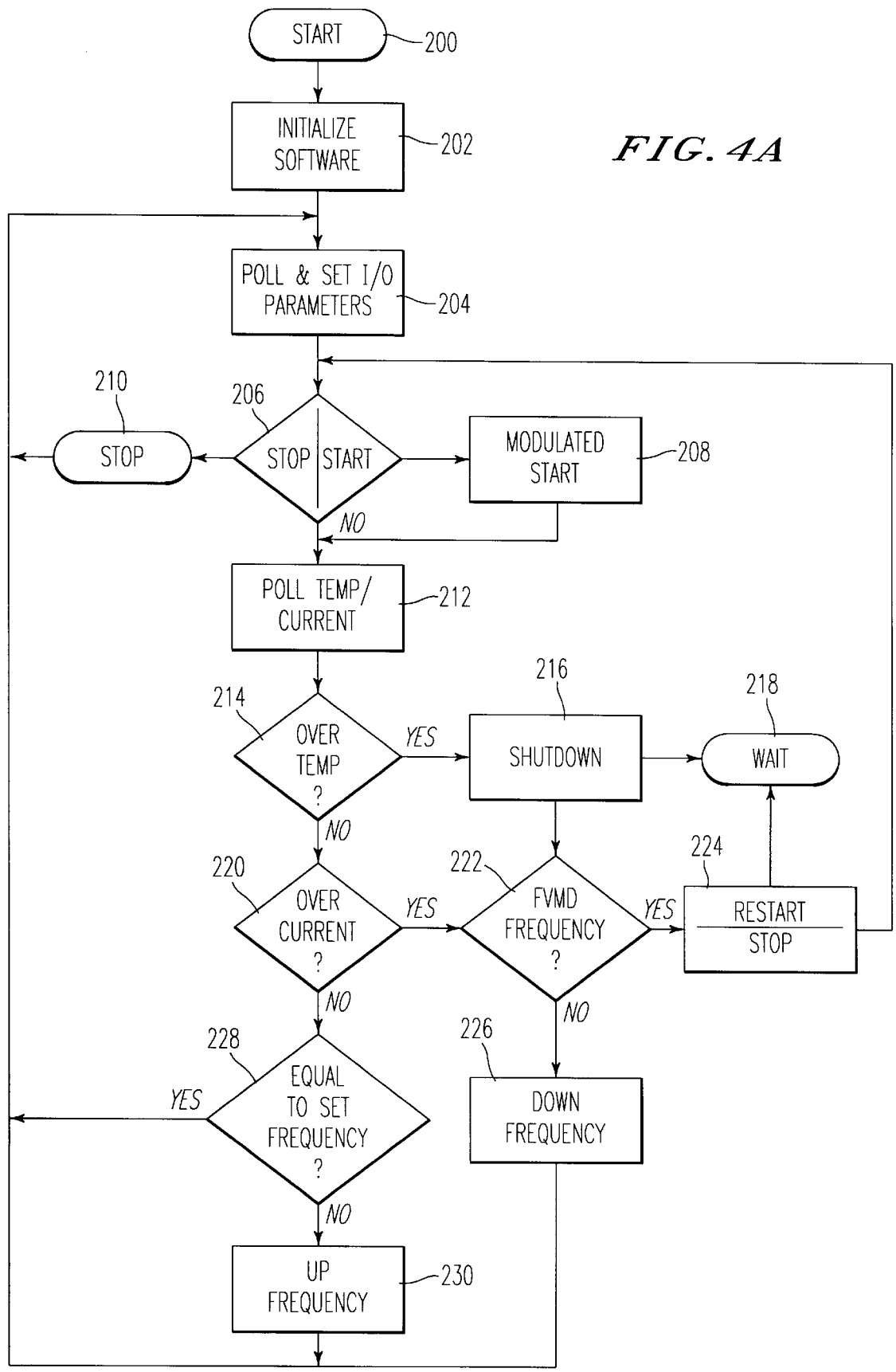
FIG. 4A is a flow chart of the software of a motor system of the invention.

The operation of the system software will become clear from the flow chart of FIG. 4A. Block 200 represents the start of the software after being reset. Block 202 indicates that the software is initialized for the particular parameters and limits for a specific type of motor. The software may, for example, be initialized as to minimum and maximum speed, full voltage minimum drive frequency, motor speed ramping rates, starting frequency and the length of the modulation starting time. This initialization is effected by adjusting EPROMs within the MCU.

As shown at 204, the MCU is programmed to poll and read the values of the I/O ports, store the parameters and begin execution of the commands.

The program at 206 then branches to a start routine 208, if the motor is stopped, or stops the motor at 210, if the motor is running. In the start routine, which will be described in more detail below, the phase signals are modulated using the start up period. The motor is started from a rest state to running at the full voltage minimum drive frequency (or higher) or a specified lower frequency corresponding to a reduced voltage level. "Stop" at 210 is the "power on" state in which the motor is not running and the input control is waiting for a start command. The control is initially set to this state.

At 212, the MCU polls temperature and current, reading the inputs from the current sense and temperature sense circuitry. At 214, the temperature signal is evaluated. If a temperature over the limit is sensed, a shutdown routine 216 is initiated, causing the MCU to cut off the drive signals. A wait period is then initiated at 218, waiting for a user to respond to the shutdown system.

If the temperature is not over the limit, the current signal is evaluated at 220. If the overcurrent condition is sensed, it is determined at 222 whether the control is at the full voltage minimum frequency or at the preset minimum frequency. If yes, the motor is shut down at 224 and, looping back to block 206, a specified number of restart attempts are performed to achieve a satisfactory running state. If no, the drive frequency is ramped down at 226. If the current is not over the limit, it is determined at 228 whether the frequency is equal to a set frequency. If yes, the motor will run at a speed corresponding to the set frequency. If no, the frequency is raised at 230 until the set frequency is reached. The motor then continues to run at a speed corresponding to the set frequency.

Figure 4B:
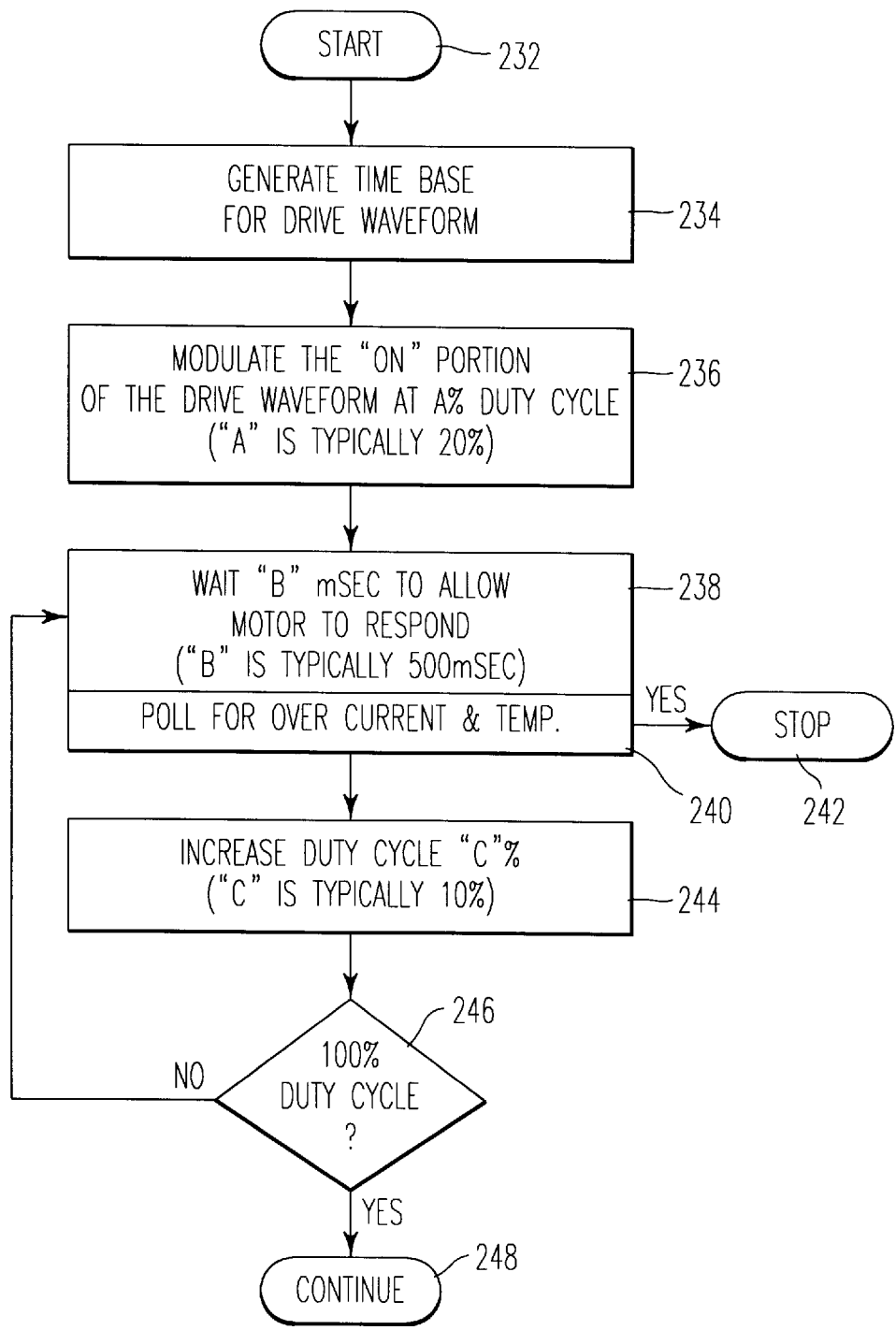
FIG. 4B is a flow chart of the starting routine of a motor system of the invention.
Figure 6A:
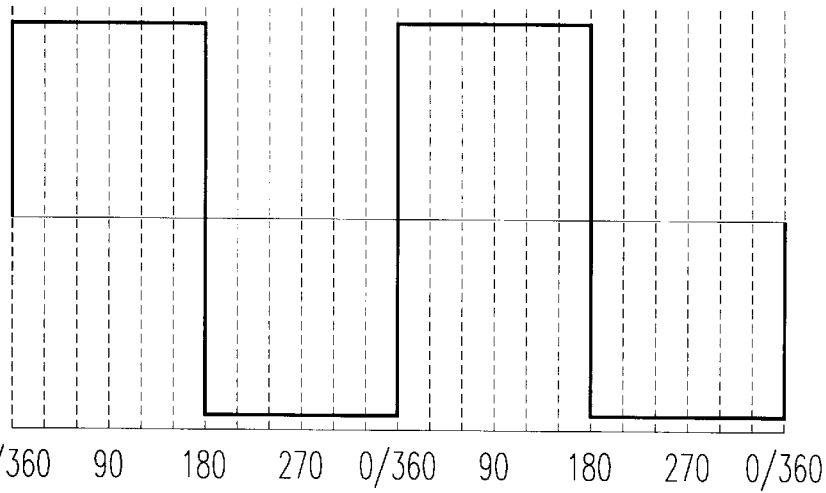
Figure 6B:
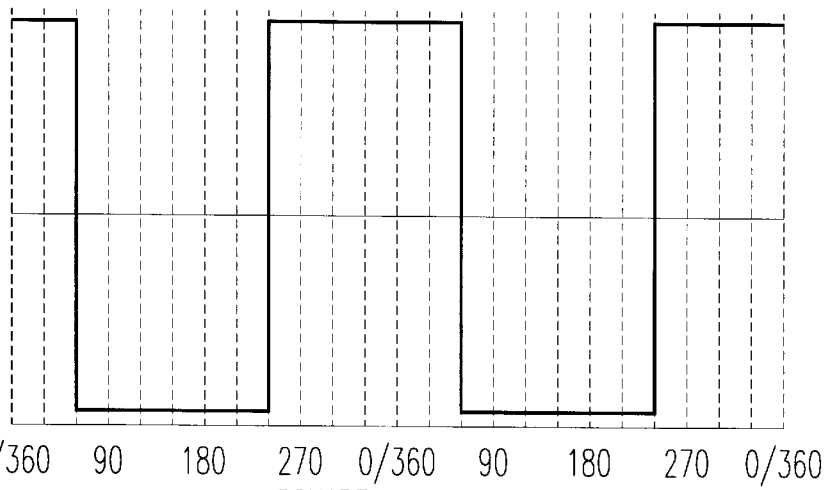
Figure 6C:
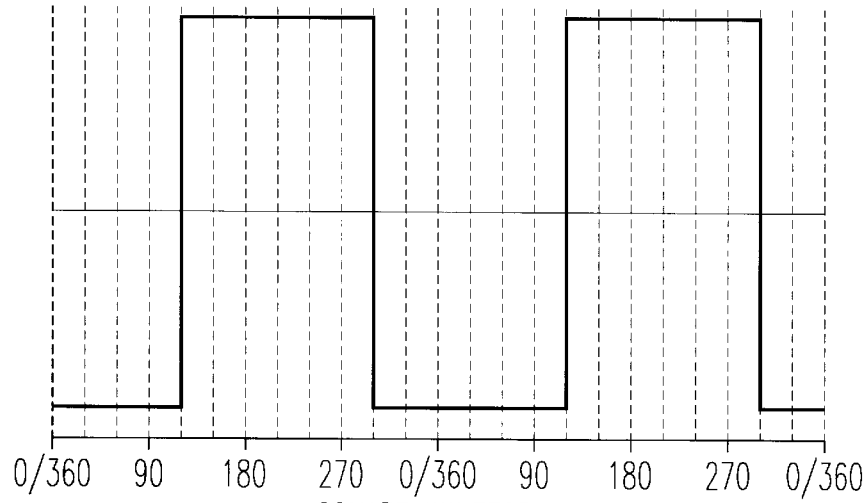
Figure 7A:
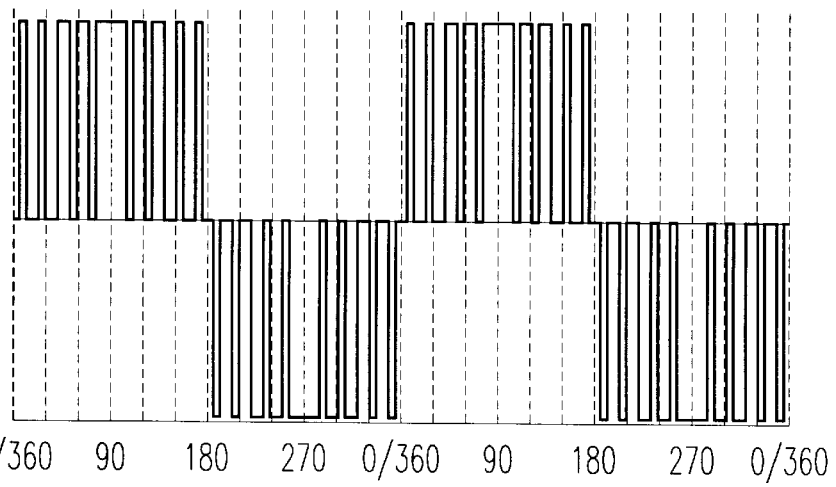
Figure 7B:
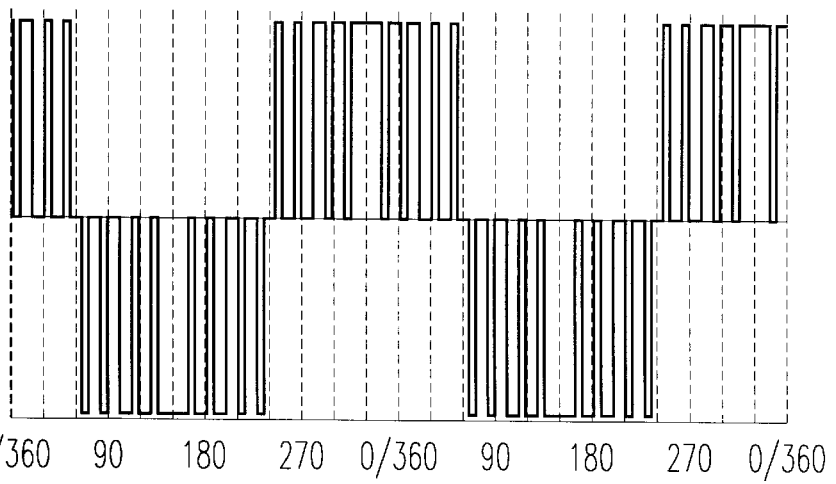
Figure 7C:
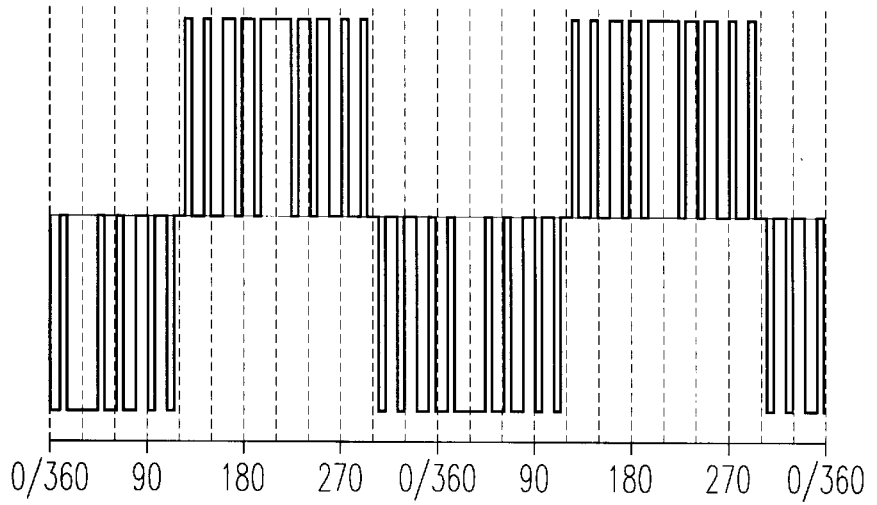
Figure 8A:
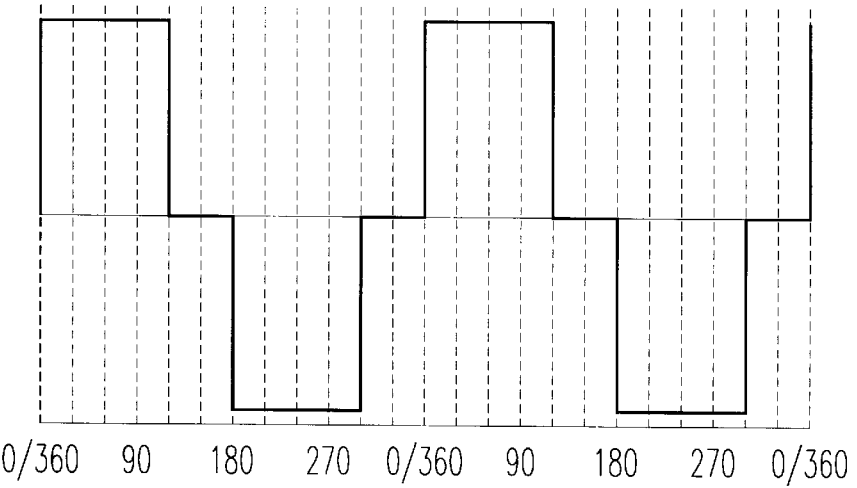
Figure 8B:
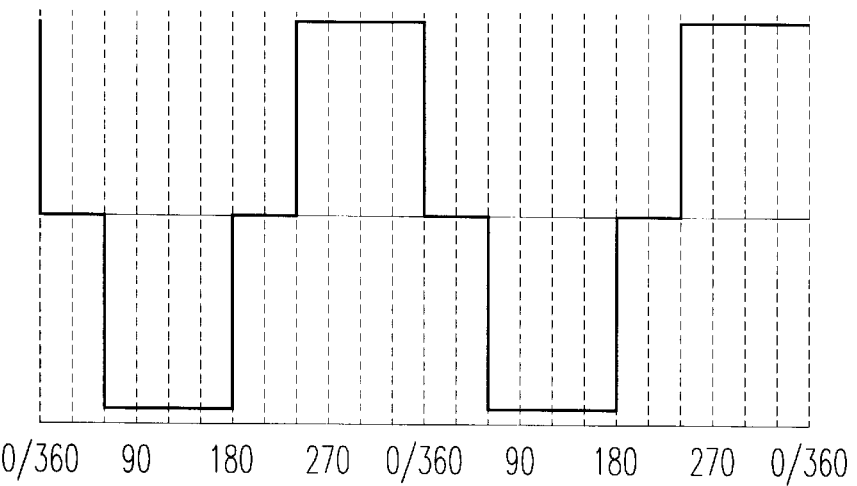
Figure 8C:
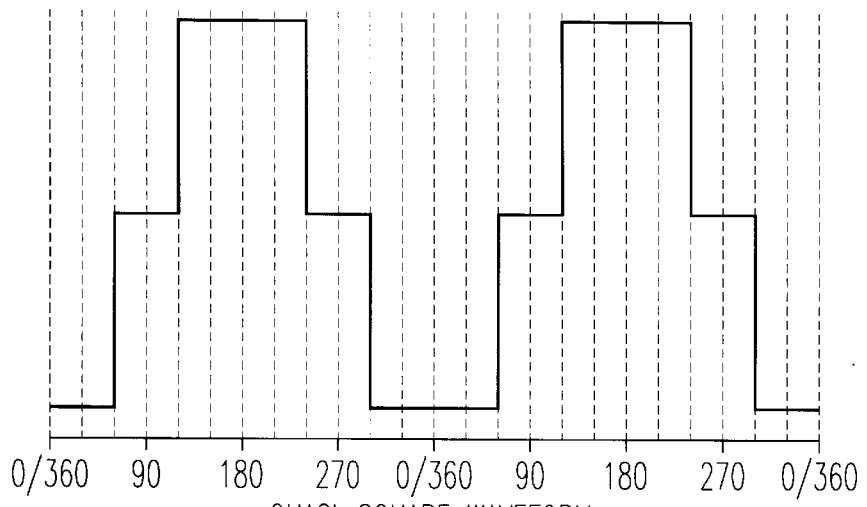

The start routine of block 208 is shown in greater detail in FIG. 4B. After the routine starts at 232, the time base for the drive waveform is generated at 234; this is the quasi-square wave waveform shown in FIGS. 8A, 8B and 8C. The "ON" portion of the drive waveform is then modulated at 236 as shown in FIG. 9. The modulation at the beginning of the start-up period is with an A% duty cycle, where "A" is typically 20%. At 238, the MCU then waits B microseconds to allow the motor to respond, where "B" is typically 500 microseconds. At 240, the MCU then polls the current and temperature sensor circuitry for the presence of an over current or an over temperature signal. If either of these signals are present, the MCU at 242 stops the generation of the drive waveforms. If the over current and over temperature signals are not present, the MCU at 244 increases the duty cycle C%, where "C" is typically 10%. The software at 246 then checks the magnitude of the duty cycle. If the duty cycle is not 100%, the software loops back to 238, 240 and 244 to increase the duty cycle another C%. If 100% duty cycle has been reached, the software at 248 then returns to the main flow chart of FIG. 4A to block 212, the polling of the temperature and current sensors.

The manner in which an effective modulated quasi-square waveform is applied to the motor is illustrated in FIG. 10A-1, 10A-2, 10A-3, 10A-4, 10a-5, 10A-6, and 10A-7, H1, H2, and H3 show the waveforms applied to high side driver inputs H1, H2 and H3 and L1, L2 and L3 show the waveforms applied to low side driver inputs L1, L2 and L3. It will be noted that modulated pulses 250 of the waveform on input H1 and the modulated pulses 252 of the waveform on input L1 are 180 degrees long, but of opposite phase. The modulation pulses 254 of the waveform on input H2 and the modulated pulses 256 of the waveform on input L2 are respectively shifted sixty degrees in phase from the modulated pulses 250 and 252. Likewise, the modulated pulses 258 of the waveform on input H3 and the modulated pulses 260 of the waveform on input L3 are respectively shifted an additional sixty degrees. The combined effect on motor 20 is shown in waveform 262. This waveform has positive modulated pulses 264 which are one hundred twenty degrees in length and are separated by gaps 266 of sixty degrees from negative modulated pulses 268 which are also one hundred twenty degrees in length. The result is a quasi-square wave having gaps 266 between positive and negative pulses. After start-up, as shown in Fig. 10B-1, 10B-2, 10B-3, 10B-4, 10B-5, 10B-6, and 10B-7 the drive waveforms are no longer modulated, but are otherwise related in time as shown in Fig. 10A-1, 10A-2, 10A-3, 10A-4, 10A-5, 10A-6, and 10A-7.

Figure 11:
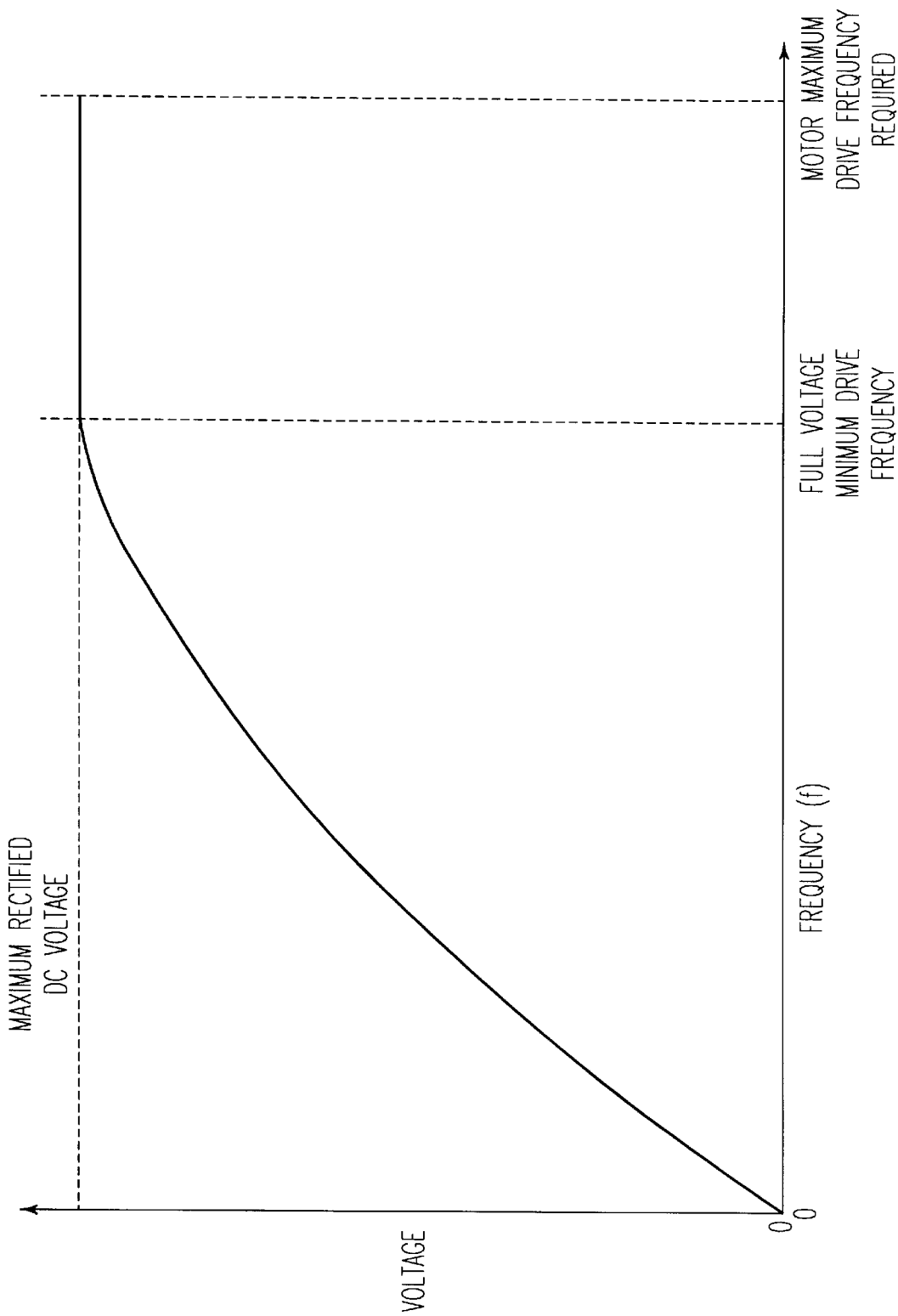
FIG. 11 shows a voltage-frequency characteristic of a particular induction motor.

In FIG. 11, a voltage-frequency characteristic of a particular induction motor is shown. At start, both the voltage across the motor and the drive frequency generated by MCU 34 are at zero. As the modulated starting period progresses, the duty cycle increases until the voltage applied to the motor increases to full voltage at the full voltage minimum drive frequency. As the frequency further increases, the voltage remains at full voltage until the maximum drive frequency is reached. It is to be understood, that this characteristic will vary for different motors and for different applications, for a signal motor, such as different load conditions.

Although the invention has been described with reference to particular embodiments, it is to be appreciated that various adaptations and modifications may be made within the spirit of the invention.

The invention claimed is:

1. A control system for an induction motor, comprising:
   control means for providing a variable frequency signal for controlling the speed of said motor, for providing phase signals from said variable frequency signals, and for a period of time, when said motor is started, for keeping said variable frequency signal and said motor speed at low levels;
   switch means for applying power from a power source to said motor;
   driver means for applying said phase signals to actuate said switch means; and power sensing means for sensing the power drawn by said motor, said control means limiting said power drawn by said motor when said power exceeds a predetermined level by ramping down said variable frequency signal to a lower frequency to lower the speed of said motor and the power drawn by said motor.

2. A motor control system as recited in claim 1, wherein, during said period of time when said motor is started, said phase signals are modulated.

3. A control system as recited in claim 2, wherein, at the start of said period of time, said phase signals are pulse width modulated at a relatively low duty cycle, and during said period of time, said duty cycle is increased in steps until a duty cycle of 100% is reached at the end of said period of time.

4. A control system as recited in claim 1, further comprising voltage control means for controlling voltage applied from said power source, and wherein said control means provides a control signal enabling said voltage control means.

5. A control system as recited in claim 4, wherein said power source comprises an AC/DC converter for converting an AC power source to a DC power voltage, and wherein said voltage control means controls the duty cycle of said converter.

6. A control system as recited in claim 5, wherein said control means provides a signal for selecting said duty cycle of said converter to control the voltage applied to said motor.

7. A control system as recited in claim 1, wherein said phase signals are three phase signals spaced 120 degrees apart and said motor is a three phase motor.

8. A control system as recited in claim 7, wherein said switch means comprises a three phase bridge for driving said motor, said bridge comprising three pairs of series connected semiconductor switches, each pair connected to a phase of said motor;

wherein said power source provides current to said pairs of series-connected semiconductor switches; and wherein said three phase signals control respective pairs of said series-connected switches.

9. A motor control system as recited in claim 8, wherein said switches of each pair are operated in opposite phase.

10. A control system as recited in claim 9, wherein said pairs of semiconductor switches effectively apply said current to said phases of said motor as quasi-square waves.

11. A control system as recited in claim 1, wherein said switch means effectively applies said power to said motor as quasi-square waves.

12. A control system as recited in claim 1, wherein said power sensing means comprises current sensing means.

13. A motor control system as recited in claim 1, wherein said control means comprises processor means.

14. A motor control system as recited in claim 13, further comprising means for initializing said processor means for a specific motor.

15. A motor control system as recited in claim 13, wherein said processor means during a starting period modulates said phase signals and wherein said means for initializing said processor means comprises means for initializing said processor as to minimum and maximum motor speed, full voltage minimum drive frequency, motor speed ramping rates, starting frequency and the duration of said starting period modulation.

16. A control system as recited in claim 13, further comprising controlled rectifier means for applying current from said power source to said motor and voltage control means enabled by said processor means to control the duty cycle of said controlled rectifier means and the power drawn by said motor.

17. A control system as recited in claim 13, further comprising thermal means for sensing overheating of said motor said processor means being responsive to the sensing of overheating by said thermal means for shutting off power to said motor.

18. A control system as recited in claim 1, further comprising thermal sensing means for sensing overheating of said motor, said control means being responsive to the sensing of overheating by said thermal means for shutting off power to said motor.

19. A motor control system, comprising;

switch means to connect a motor across a power supply;

frequency control means providing switching signals to said switch means at a variable frequency, the speed of said motor being related to said frequency being kept at a low level for a period of time when said motor is started; and power limit means responsive to power drawn by said motor which exceeds a predetermined level for controlling said frequency control means to reduce said frequency and said speed of said motor to reduce the level of power drawn by said motor.

* * * * *